Sept. 9, 1952      E. O. WIRTH ET AL      2,610,044
CARBURETOR
Original Filed Dec. 27, 1943
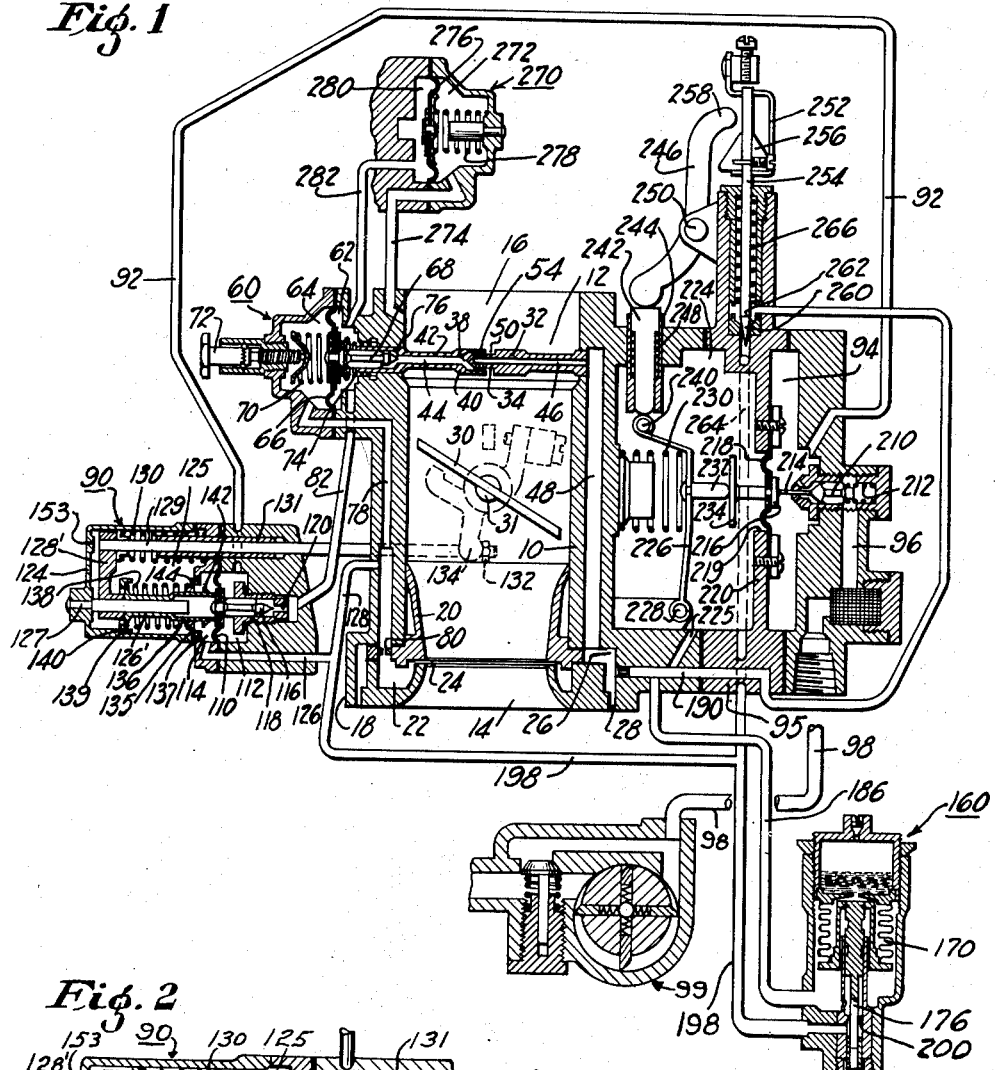
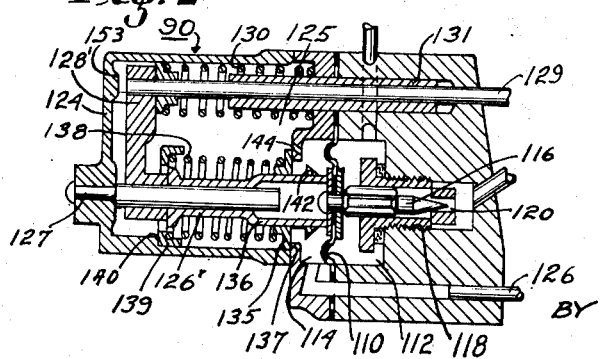
INVENTORS
FREDERIK BARFOD
EMIL O. WIRTH Patented Sept. 9, 1952

2,610,044

UNITED STATES PATENT OFFICE 2,610,044

CARBURETOR

Emil O. Wirth and Frederik Barfod, South Bend, Ind., assignors to Bendix Aviation Corporation, South Bend, Ind., a corporation of Delaware Continuation of abandoned application Serial No. 515,726, December 27, 1943. This application December 18, 1948, Serial No. 66,092

11 Claims. (Cl. 261—37)

This invention relates to fuel feeding systems for internal combustion engines and more particularly to devices or systems in which the fuel is supplied thereto under superatmospheric pressure and is metered while being maintained under pressure. This application is a continuation of application Serial No. 515,726 filed December 27, 1943, now abandoned.

One of the principal objects of the invention is to provide a simplified device of this character which may be built at reasonable cost and which is capable of accurately regulating the fuel supply to maintain a proper fuel-to-air ratio through wide ranges of engine load, speed, and variations in altitude such as are experienced with an aircraft engine.

Another object of the invention is to eliminate boiling of the fuel under high temperature or altitude conditions, such as are experienced with an aircraft engine, to thereby insure accurate metering. This is accomplished by maintaining the fuel under positive pressure until it is discharged into the air supply to form a combustible mixture for the engine.

Still another object of the invention is to finely atomize the fuel discharged into the air stream to produce an improved mixture capable of being readily ignited even though the engine is cold.

A further object of the invention is to provide a fuel feeding device or system which will operate properly in any position so that when installed on an aircraft engine the latter will be properly supplied with fuel regardless of the position of flight.

It is a further object of the invention to provide a device or system of this character wherein fuel at constant pressure is supplied to a fuel metering jet system and thence to a nozzle, the metering of the fuel being primarily controlled by controlling the fuel pressure at the nozzle by a counterbalancing pressure and by suction resulting from the operation of the engine.

A still further object of the invention is to provide a device of this character wherein a fluid control valve is urged in opposite directions by respective means exerting substantially constant pressures which normally balance each other and the control of said valve is effected by means adapted to vary the pressure of one of the balanced pressure means.

A further object of the invention is to provide a device of this character wherein one of the balance pressure means is unbalanced according to induction passage suction which may be suction anterior to the throttle valve.

Further objects of the invention relate to modification of the fuel control in accordance with variations in the pressure of air supplied to the engine; and to the provision of an economizer arrangement including a variable metering jet system to vary the richness of the mixture for high power output operating conditions.

Still further objects of the invention relate to the inclusion of an idling system in a device of this character for securing accurate fuel metering during operation at or near idling by means actuated with the throttle for varying the effective capacity of the variable metering jet system; and to the provision of an idle cut-off for stopping the flow of fuel when the engine is to be stopped and to prevent discharge of fuel into the induction passage at such times as the engine is inoperative.

Other objects and advantages of the invention will be readily apparent to those skilled in the art from the following description taken in connection with the accompanying drawing, which represents a preferred embodiment. After considering this embodiment skilled persons will understand that many variations may be made without departing from the principles disclosed; and we contemplate the employment of any structure, arrangements, or modes of operation that are properly within the scope of the appended claims.

In the drawings:

Figure 1 diagrammatically illustrates a fuel feeding system embodying the present invention, parts of said system being shown in section.

Figure 2 is an enlarged view of the variable metering unit.

Referring more particularly to the drawings, there is shown a main body member 10 which contains an induction passage 12 having an air inlet 14 and an outlet 16, the air inlet being provided with an outer surface 18 to which an air scoop (not shown) opening in the direction of travel may be secured and the outlet being provided with flanges (not shown) for securing the body member 10 to the manifold of an internal combustion engine or to the inlet of a supercharger if one is used between the carburetor and the manifold. If desired, a supercharger may be used anterior to the body member 10 either in place of or in addition to a supercharger posterior to said body member. A venturi 20 having separable inlet and outlet sections is positioned in the induction passage adjacent the inlet 14 and is formed with an annular chamber 22 which communicates with the interior of the venturi through an annular slot 24 to be thereby subjected to Venturi depression. An annular chamber 26 is in free communication with the air entering the venturi through an annular opening 28, the opening 28 being preferably subjected to the impact pressure of the air supplied to the venturi. A throttle 30, pivotally mounted on a throttle shaft 31, is disposed in the induction passage posterior to the venturi and is adapted to be manually actuated to control the air flow to the engine.

Fuel is discharged into the induction passage 12 from a fuel discharge nozzle comprising a member 32 mounted in the wall of the body 10 and extending transversely of the induction passage 12. The member 32 is provided with a reduced diameter end portion 34 which projects into an enlarged portion 38 of a tubular extension 40 of a valve guide and seat member 42. The nozzle is provided with a fuel passage 44 and an air passage 46, the latter being supplied by air from chamber 26 through a passage 48. Ports 54 connect the air passage 46 with chamber 44 and fuel emulsion is discharged into the induction passage from an annular groove 50.

Fuel flow to the fuel discharge nozzle is regulated or controlled primarily by a nozzle control unit or assembly indicated generally at 60 and comprises a hollow casing the interior of which is divided into two compartments, 62 and 64 respectively by a preformed, annularly grooved flexible diaphragm 66 connected to a fuel control valve 68 which controls the fuel flow from the nozzle control unit 60 to the discharge nozzle. The valve 68 is urged to the right in the closing direction by a spring 70 arranged to be variably loaded by an adjustment screw 72. The stem of valve 68 is of triangular cross section or otherwise relieved to permit fuel flow therepast and is slidable within the nozzle bar 42. In this arrangement the valve is not fixed to the diaphragm 66 but is maintained in abutting relation therewith by a light spring 74, thus eliminating any tendency for the valve to bind in its valve guide and seat member 76 as a result of misalignment between the diaphragm and the guide member. The chamber 64 of the fuel nozzle unit 60 is connected to the Venturi annulus 22 by a passage 78 having a calibrated restriction 80 therein and the chamber 62 is supplied with fuel by a connection 82 leading from a fuel metering unit indicated generally at 90 which in turn is supplied with fuel through a conduit 92 connected with a chamber 94 in a lateral extension 95 of the body 10 and chamber 94 is provided with an inlet passage 96 adapted to be connected by a pipe 98 with an engine driven fuel pump 99 of any well known type which delivers fuel at a substantially constant super-atmospheric pressure.

The fuel metering unit 90, anterior to the nozzle control unit 60, which determines the effective area of the fuel metering restriction under various conditions of operation, may be formed as a part of the main body 10 or may be a separable unit secured to the body or other convenient support. A metering unit similar to the one described herein is disclosed in our Patent No. 2,445,846 issued July 27, 1948. In the present unit, a diaphragm 110 separates the interior of the unit into chambers 112 and 114, chamber 112 being connected with the conduit 82 which leads to the chamber 62 of the nozzle control unit 60, while chamber 114 is connected to the Venturi annulus 22 by a conduit 126 and passages 128 and 78. The diaphragm 110 is secured to a metering valve 116, slidable in a plug 118, and having a tapered end cooperating with a metering orifice 120 formed in the plug 118, said valve 116 normally being at least slightly open.

The metering unit 90 includes a casing member 124 enclosing a chamber 125 within which is a tubular sleeve 126' which is slidable on a guide pin 127. The sleeve 126' provides a one-way connection between diaphragm 110, and a cross bar 128' secured to a rod 129 urged to the left, as shown in the drawing, by a spring 130 and slidable in a guide 131. The rod 129 is provided with a nut 132 adjacent its free end, said nut being engageable by a finger 134' secured to the throttle shaft 31. A spring retainer 135, slidable on an enlarged portion 136 of sleeve 126', is yieldingly urged to the right against a wall 137, by a preloaded spring 138 reacting between said retainer 135 and a second spring retainer 139 abutting against shoulder 140 of casing 124, said retainer 139 having an opening through which sleeve 126' is adapted to freely move. The enlarged portion 136 of sleeve 126' is provided with an annular flange 142 which may be moved to the right of spring retainer 135 under certain operating conditions and is adapted to move to the left, under the influence of the diaphragm 110, through an opening 144 in wall 137 and engage said retainer 135. Further movement of the sleeve to the left is then yieldingly resisted by the spring 138. The movement of the rod 129 and cross bar 128' to the left is limited by stop 153 integral with the casing member 124 at such times as the throttle is open beyond its idling or near idling positions and the diaphragm is urged to the left by the pressure of fuel in chamber 112. The sleeve 126' limits such movement of the diaphragm and when the throttle is opened beyond the near idling position the fuel pressure in chamber 112 and suction in chamber 114 move the diaphragm 110 and valve 116 to the left only sufficiently far to withdraw the valve partially from the orifice 120. During high power operation, however, the fuel pressure in chamber 112 and the low Venturi pressure in chamber 114 create a sufficient pressure differential across the diaphragm 110 so that valve 116 is completely withdrawn from the orifice 120 against the pressure of spring 138.

Thus during idling, the valve 116 enters part way into and cooperates with the orifice 120 to limit the area for fuel flow. As the throttle is opened from the idling range the valve 116 moves to the left until the flange 142 engages the spring retainer 135, thereby increasing the effective fuel metering area to permit a sufficient amount of fuel flow for normal cruising operation. At high power output the valve 116 is moved to the left, as shown in the drawings, against the force of spring 138 which is to be compressed so that at a predetermined high Venturi suction said valve is completely withdrawn from the orifice 120, whereby an enriched mixture is produced as is desired during high power operation.

An automatic mixture control unit, indicated generally at 160, may, if desired, be provided to modify the suction in chamber 64 in accordance with barometric pressure and/or temperature. This unit includes a bellows 170 adapted to actuate a valve member 176 which cooperates with a valve seat 200 to control communication between a conduit 186, connected with chamber 26 through a conduit 190, and a conduit 198 which is connected with conduit 128 leading to the passage 78.

It is also desirable to incorporate a manual mixture control arrangement which as shown includes a valve 254 adapted to be actuated from the pilot's compartment by a cable actuated member 252. Valve member 254 is provided with a tapered end 260 which cooperates with a seat 262 for controlling communication between conduit 190 and a conduit 264 having a connection with the conduit 198. A spring 266 is adapted to urge the valve member 254 in the closing direction. By opening the valve 254, air from chamber 26 may be bled to passage 78 to modify the Venturi suction transmitted to chamber 64 from the Venturi annulus 22. It is to be noted that a cable, not shown, is connected to the member 252 and a cable actuating device of any suitable well known character is provided in the pilot's compartment and arranged so that actuation thereof will move the valve 254 upwardly, as shown in the drawings, against the force of spring 266.

Inasmuch as valves 68 and 116 are normally open for idling, it is desirable to provide a fuel cut-off arrangement whereby the flow of fuel to the engine may be positively cut off for stopping said engine and also to prevent fuel escaping into the induction passage of the carburetor when the engine is not in operation. This arrangement, as shown, includes a valve 210 which controls the fuel passage 96 into the chamber 94. The valve 210 is normally urged to the left in the closing direction by a relatively light spring 212 and is provided with an extension 214 which projects inwardly of chamber 94 and abuts against a rivet 216 centrally disposed in a flexible diaphragm 218 which closes opening 219 in wall 220 of the lateral extension 95. The diaphragm 218 is marginally secured to said wall 220 and the rivet 216 extends through said opening. Within the extension 95 there is also a chamber 224 which may be vented to chamber 26 through conduits 225 and 190. It is to be noted that, if desired, chamber 224, instead of being vented to the chamber 26, may be vented directly to atmosphere. Within the chamber 224 is disposed a lever 226 movable on a pivot 228 adjacent one end, said lever 226 being normally urged to the right by relatively strong spring 230. A pin 232 is secured to the lever 226 and is engageable with an enlarged head 234 of the rivet 216. Normally spring 230 is adapted to overcome spring 212 and maintain valve 210 open, said spring 230 being strong enough to also overcome the pressure of fuel on the diaphragm 218 which is of relatively small area. The free end of lever 226 may be provided with a rounded head portion 240 engageable by a plunger 242 which is slidable in a guide 244, and urged outwardly of chamber 224 by a spring 248 and into engagement with one end of a lever 246. Lever 246 is pivoted at 250 intermediate its ends and is adapted to be actuated by a cone-shaped collar 256 secured to the valve member 254, said collar being adapted to engage an extension 258 of the lever 244 as valve 254 approaches its upward limit of movement and preferably after said valve 254 is fully open so that valve 254 may be moved from its fully closed to its fully opened position without actuating the cut-off valve. When the valve 254 is moved in the opening direction, upwardly, as shown in the drawings, beyond the point whereat the collar 256 first contacts the end 258 of lever 246, the lever will be actuated in a manner whereby the plunger 242 is forced inwardly of the chamber 224, thereby forcing the lever 226 in a counterclockwise direction against the resistance of spring 230. The lever 226 is thus moved to a position whereat the pin 232 is moved out of engagement with the head 234 of rivet 216 whereupon the spring 212 urges the valves 210 to its closed position thus cutting off the flow of fuel to the fuel nozzle.

Also, if desired, the device may include an acceleration pump indicated generally at 270 which includes a suction chamber 272 connected through a pipe 274 with the induction passage 12 posterior to the throttle. A diaphragm 276 urged to the left by a spring 278 separates the suction chamber 272 from a fuel chamber 280 connected through a pipe 282 with the fuel chamber 62 of the nozzle control unit 60. During periods of high engine suction operation, the diaphragm 276 is moved to the right and fuel "robbed" from the chamber 62 is drawn into the chamber 280. Upon a loss in engine suction, as upon acceleration, the spring 278 forces the diaphragm to the left and pumps fuel from chamber 280 to the nozzle chamber 62 and thence to the fuel discharge nozzle, thereby temporarily enriching the mixture.

*Operation*

Assuming the carburetor has not been filled with fuel and the idle cut-off plunger 254 is in the position shown in the drawing, the spring 230 will urge the lever 226 and diaphragm 218 to the right and open the fuel valve 210. Fuel under pressure, supplied by pump 99 at substantially constant superatmospheric pressure, flows through the passage 96, chamber 94, pipe 92, metering unit 90, and pipe 82 to the chamber 62. The pressure of spring 70 on the diaphragm 66 is adjusted by means of screw 72 so that the spring force urging the valve 68 toward the closed position is substantially equal in value to the force created by the normal fuel pressure in chamber 62 on the opposite side of said diaphragm urging the valve 68 toward the open position; it being understood that the effective pressure of spring 70 is so adjusted with respect to the normal fuel pressure in chamber 62 that the valve 68 is normally in a partially open position when the air pressure in air chamber 64 is atmospheric.

During normal operation, the air flow through the induction passage will create a suction in venturi 20 which will vary in accordance with the quantity of air being supplied to the engine. This suction is transmitted through slot 24, annulus 22 and passage 78 to the chamber 64 and opens valve 68 until the rate of fuel flow is such that the pressure of the fuel in chamber 62 is reduced by virtue of the metering jet system 90 an amount equal to the decrease in the pressure in chamber 64. The differential in the fuel pressures on opposite sides of the metering jet system 90 thus varies directly in accordance with the suction in chamber 64 and consequently the quantity of fuel supplied to the engine will be controlled in constant proportion to the quantity of air.

Under certain operating conditions it is, of course, desirable to vary the quantity of fuel supplied to the engine, relative to that supplied under normal operating conditions, as for idling, that is, in order to provide the proper quantity of fuel for idling when the suction on the fuel delivery nozzle posterior to the throttle is relatively high, the quantity of fuel supplied to the engine is reduced by moving the valve 116 of the fuel metering unit 90 to a more nearly closed position than it would occupy under the influence of the fuel pressure in chamber 112 and the suction in chamber 114. This reduction of fuel supplied to the engine is effected by means of the mechanical linkage between the throttle valve and the fuel valve 116.

Under other operating conditions the fuel-to-air ratio may be automatically modified by the metering jet system 90. As the effective area of this jet system determines the quantity of fuel which will be supplied to the nozzle control unit 60 for any given suction in passage 78, increasing or decreasing the said effective area of the metering jet 120 as said suction correspondingly varies, the richness of the mixture will be correspondingly increased or decreased. Various types of metering jet systems may, of course, be used with devices of the instant character to automatically vary the richness of the mixture to produce a rich mixture during high power operation, or to produce a leaner mixture during light load operation, or to otherwise vary the richness of the mixture under particular conditions of operation of the engine.

Under some circumstances it is also desirable to manually vary the richness of the fuel mixture and in the present device such control may be effected by the valve 254, said mixture being enriched by closing said valve 254 for high speed and power conditions of the engine and leaned when said valve is opened, for economical operation of the engine.

When it is desired to stop the engine the fuel cut-off valve 210 is closed and said valve is maintained closed whenever the engine is not running, as above pointed out.

It will be apparent from the foregoing that a relatively simple, inexpensive pressure type carburetor has been provided that is capable of accurate fuel-to-air proportioning under various operating conditions, it being thought that the invention and many of its attendant advantages will be understood from the foregoing description though said invention has been illustrated in connection with but a single modification thereof, and it will be apparent that various changes may be made in the form, construction and arrangement of the parts without departing from the spirit and scope of the invention or sacrificing all of its material advantages, the form hereinbefore described being merely a preferred embodiment.

We claim:

1. In a fuel supply system for an internal combustion engine having an induction passage and a throttle therein: an engine driven fuel pump adapted to deliver fuel at a substantially constant pressure; a fuel conduit connecting the pump with the induction passage; a variable metering jet system in said conduit; a valve for said conduit posterior to said jet; means including a diaphragm subjected to fuel pressure on one side and so constructed and arranged that the valve is urged in the opening direction by said fuel pressure, the opposite side of said diaphragm being subjected to air pressure; means including a spring urging the valve in the closing direction with a force normally balancing the fuel pressure on the diaphragm when the air pressure on the diaphragm is substantially atmospheric and the valve is partially open; means adapted to act on the diaphragm to reduce the effective force of the spring upon increase of air flow through the induction passage anterior to the throttle; means connected with the throttle and adapted to vary the metering jet capacity; manually controlled means adapted to vary the effect of the air flow upon the diaphragm; and means so constructed and arranged as to at least in part control the variable metering jet system by suction in the induction passage anterior to the throttle.

2. In a fuel supply system for an internal combustion engine having an induction passage and a throttle therein: an engine driven fuel pump adapted to deliver fuel at a substantially constant pressure; a fuel conduit connecting the pump with the induction passage; a valve for said conduit; means, including a diaphragm, so constructed and arranged that the valve is urged in the opening direction in accordance with the pressure of fuel on said diaphragm; means including a spring and a chamber for air under pressure varying with variations in air flow through the induction passage for urging the valve in the closing direction with a force normally balancing the fuel pressure acting to urge the valve in the opening direction; and a variable metering jet system anterior to said valve and comprising a casing, a diaphragm separating said casing into a fuel chamber and an air chamber, a metering jet, a movable valve member connected with the diaphragm and adapted to control the effective capacity of the metering jet, a guide fixed to the casing, a sleeve slidable on the guide and having one end adapted to be operably connected with the diaphragm, a spring retainer adjacent one end of the sleeve and held against movement in one direction relative to the casing, a second spring retainer slidably disposed relative to the sleeve, a preloaded spring reacting between said spring retainers, an abutment on the sleeve adapted to engage the second mentioned spring retainer, said spring retainer being so positioned as to permit limited free movement of the sleeve, the first mentioned spring retainer having an opening therein through which the sleeve is adapted to pass, and means adapted to operably connect the sleeve with the throttle valve for positively moving the movable valve member to a partly closed position when the throttle valve is in the idling position.

3. In a fuel supply system for an internal combustion engine having an induction passage controlled by a throttle and an engine driven fuel pump adapted to deliver fuel at a substantially constant pressure: a variable metering jet system comprising a casing; a diaphragm separating said casing into a fuel chamber and an air chamber; a metering jet; a movable valve member connected with the diaphragm and adapted to control the effective capacity of the metering jet; a guide fixed to the casing; a sleeve slidable on the guide and having one end adapted to be operably connected with the diaphragm; a first spring retainer adjacent one end of the sleeve and held against movement in one direction relative to the casing; a second spring retainer slidably disposed relative to the sleeve; a preloaded spring reacting between said spring retainers; an abutment on the sleeve adapted to engage the second mentioned spring retainer, said spring retainers being so positioned as to permit free movement of the sleeve, the first spring retainer having an opening therein through which the sleeve is adapted to pass; and means adapted to operably connect the sleeve with the throttle valve for positively moving the movable valve member to partly closed position when the throttle valve is in the idling position.

4. A three-stage metering jet assembly for use in a fuel system for an engine having a throttle comprising a fuel passage, a metering orifice in said passage, a valve for said orifice, a linkage between said valve and said throttle for positively limiting the degree to which said valve will open while said throttle is in closed or nearly closed position, a means responsive to fuel pressure for urging the valve in the opening direction, and a yieldable stop means adapted to maintain said valve in a fixed partially open position throughout the engine cruising range and to permit the said valve to move in the opening direction for high power output.

5. A three-stage metering jet assembly for use in a fuel system for an engine having a main control element comprising a fuel passage, a metering orifice in said passage, a valve for said orifice, a linkage between said valve and said element for limiting the degree to which said valve will open while said element is regulating the engine for low power output, a means responsive to fuel pressure for urging the valve in the opening direction, and a yieldable stop means adapted to maintain said valve in a fixed partially open position throughout the engine cruising range and to be moved by the pressure responsive means in the direction to permit said valve to open further.

6. A three-stage metering jet assembly for use in a fuel system for an engine having an induction passage with a throttle comprising a fuel passage, a metering orifice in said passage, a valve for said orifice, a linkage between said valve and said throttle for positively limiting the degree to which said valve will open while said throttle is in closed or nearly closed position, a means responsive to unmetered fuel pressure and Venturi suction for urging the valve in the opening direction, and a yieldable stop means adapted to maintain said valve in a fixed partially open position throughout the engine cruising range and to permit said valve to move in the opening direction for high power output.

7. A three-stage metering jet assmbly for use in a fuel system for an engine having a throttle comprising a fuel passage, a metering orifice in said passage, a valve for said orifice, a linkage between said valve and a control means for said throttle for positively limiting the degree to which said valve will open while said throttle is in closed or nearly closed position for engine idling, a means responsive to unmetered fuel pressure for urging the valve in the opening direction, and a yieldable stop means adapted to maintain said valve in a fixed partially open position in opposition to the pressure responsive means throughout the engine cruising range and to be moved by the pressure responsive means in the direction to permit said valve to open further for high power output.

8. In a charge forming device for an internal combustion engine having an induction passage with a throttle valve therein, a fuel conduit, an orifice in said conduit, a pressure responsive valve for regulating the effective size of said orifice, said valve adapted to be urged in the opening direction by fuel pressure, yieldable stop means for maintaining said valve in a fixed position throughout the engine cruising range, said stop means being adapted to yield when the fuel pressure reaches a predetermined value to provide an enriched fuel-air mixture for high power output, and a linkage actuated by the throttle valve for positively limiting the degree to which said valve will open during engine idling.

9. In a fuel metering system for an internal combustion engine having an induction passage with a throttle and a venturi therein, a fuel conduit adapted to deliver fuel from a source to said induction passage, a metering orifice in said conduit, a valve for regulating the effective size of said orifice, a pressure responsive means for controlling said valve, said means being urged in the valve opening direction by fuel pressure and Venturi suction, a linkage actuated in conjunction with the throttle for positively limiting the degree to which said valve will open during engine idlng, and a spring loaded stop means for retaining said valve in a fixed partially open position throughout the engine cruising range, sad stop means being adapted to yield when the fuel pressure and Venturi suction reach predetermined relative values to provide an enriched fuel-air mixture for high power output.

10. A fuel flow regulating means in a fuel system for an engine having an induction passage with a throttle therein, comprising a conduit, an orifice in said conduit, a valve for regulating the effective size of said orifice, a throttle actuated means for positively limiting the degree to which said valve will open for engine idling, a means responsive to fuel pressure for urging said valve in the opening direction, and a resilient stop means for retaining said valve in said orifice at a fixed position of greater effective orifice area than at idling throughout the engine cruising range, said stop means being adapted to yield in the valve opening direction when the fuel pressure reaches a predetermined value to provide an enriched fuel-air mixture for high power output.

11. A fuel flow reguating means in a fuel system for an engine having an induction passage with a throttle and venturi therein, comprising a conduit, an orifice in said conduit, a valve for regulating the effective size of said orifice, a throttle actuated means for positively limiting the degree to which said valve will open for engine idling, a means responsive to fuel pressure and Venturi suction for urging said valve in the opening direction, and a spring loaded stop means for retaining said valve in said orifice at a fixed position of greater effectve orifice area than at idling throughout the engine cruising range, said stop means being adapted to yield in the valve opening direction when the fuel pressure and Venturi suction reach predetermined relative values to provide an enriched fuel-air mixture for high power output.

EMIL O. WIRTH.
FREDERIK BARFOD.

REFERENCES CITED

The following references are of record in the file of this patent:

UNITED STATES PATENTS

| Number | Name | Date |
|---|---|---|
| 1,796,734 | Tice | Mar. 17, 1931 |
| 2,283,021 | Udale | May 21, 1942 |
| 2,445,846 | Barfod et al. | July 27, 1948 |
| 2,447,264 | Beardsley | Aug. 17, 1948 |
| 2,457,765 | Winkler | Dec. 28, 1948 |